Jan. 4, 1966 J. D. WOLF 3,228,009

INFORMATION STORAGE AND READOUT SYSTEM

Filed Aug. 5, 1958 3 Sheets-Sheet 1

J. D. WOLF
INVENTOR

BY Homer C. Montague
ATTORNEY

Jan. 4, 1966 J. D. WOLF 3,228,009

INFORMATION STORAGE AND READOUT SYSTEM

Filed Aug. 5, 1958 3 Sheets-Sheet 2

J. D. WOLF
INVENTOR

BY Homer C. Montague
ATTORNEY

INFORMATION STORAGE AND READOUT SYSTEM

Filed Aug. 5, 1958 3 Sheets-Sheet 3

J. D. WOLF
INVENTOR.

BY Homer R. Montague
ATT'Y

United States Patent Office 3,228,009

Patented Jan. 4, 1966

3,228,009

INFORMATION STORAGE AND READOUT SYSTEM

Jesse David Wolf, Bethesda, Md., assignor to Marriott-Hot Shoppes, Inc., a corporation of Delaware Filed Aug. 5, 1958, Ser. No. 753,249

7 Claims. (Cl. 340—173)

This invention has to do with information storage and readout systems, and especially to systems in which relatively permanent (but readily changeable) information is stored in a memory device in an orderly manner as groups of codes, together with control arrangements such that, upon the selective energization of any one of a number of input control circuits, the appropriate codes of a group will be delivered in sequence to an output channel or channels.

From what has been said above, it will be obvious that my invention is directed to an information system of the prestored type, any selected group or set of codes being delivered to an output circuit on demand. As contrasted with another common form of information storage system, the present invention does not provide for the insertion of the information into the memory under remote control, but merely for its selective dispensation. Prestored information systems of various kinds have been developed, including electrical and mechanical varieties, and are well known in the art. But it is a principal object of the present invention to provide a system of this type in which the desired selection of code groups can be effected quickly and accurately under remote control, while at the same time permitting the correction or changing of the stored code information whenever required, and by relatively unskilled personnel, such as ordinary clerical employees of a business. The operation of correcting the stored information is a purely manual and mechanical one, and the changes required can be made without any knowledge on the part of the person doing the work, as to the coding system employed or as to the manner of operation of the equipment.

Basically, the system of the invention is an improvement on the drum type of information storage system described in my prior application for U.S. patent, Serial No. 737,642, filed May 26, 1958, and is intended for use in the same general type of equipment, or wherever there is needed a fast and accurate system for delivering preselected code groups in response to the energization of a single selecting conductor, together with a mechanical arrangement permitting simple and rapid changing of so much of the stored information as may, from time to time, be desired.

In general, the storage medium of the invention consists of a multiplicity of punched tapes or the like, all of the same length and arranged side by side upon the periphery of a carrying drum or the like, so that each tape, carrying a plurality of groups of codes or punchings, can readily be exchanged for a revised tape, without disturbing the others. The arrangement of the groups of codes with several groups on each tape facilitates the use of a simple digital selection system, such that the desired code group, and no other, will be caused to deliver its coded message to an output channel, upon the energization of a single control conductor or circuit. The drum is arranged to rotate continuously, at a speed commensurate with the desired shortness of the search or access time, and to rotate at a slower speed during the reading out of the selected code group, as at a speed commensurate with the operating speed of the equipment which is to receive the coded impulses. Thereupon, the original higher speed of drum rotation is resumed, in preparation for the next search operation. The drum is preferably made of conductive material, either metal or metal-clad, so that when conventional code tapes of the punched paper or plastic type are mounted on the drum, readout can be effected by a simple set of brushes allowed to contact the conducting material through the punched holes. Provision is made for maintaining the brushes out of contact with the tapes except when a search or readout operation is to be performed, to minimize wear of the tapes.

A preferred form of the invention, selected by way of example, is described below in connection with the appended drawings, in which.

The invention is especially intended for use in a system in which a calculating printer or typewriter is caused to type out the clear text names of items or work operations, together with an item or operation price, whose code is associated with the code for the clear text name code on the record tape. The operation of a keyboard operates to control a conventional crossbar switch, of the kind used in automatic telephony, to energize a single conductor in accordance with the keyboard selections; the selected single conductor then controls the memory storage device to cause it to emit the necessary impulses for control of the printing calculator. This type of operation, and the way in which it is preferably applied to control of business transactions, is fully described in the prior application mentioned above. For the purpose of disclosing the present improvements, however, it is unnecessary to consider any of the equipment ahead of the crossbar switch.

Figure 1:
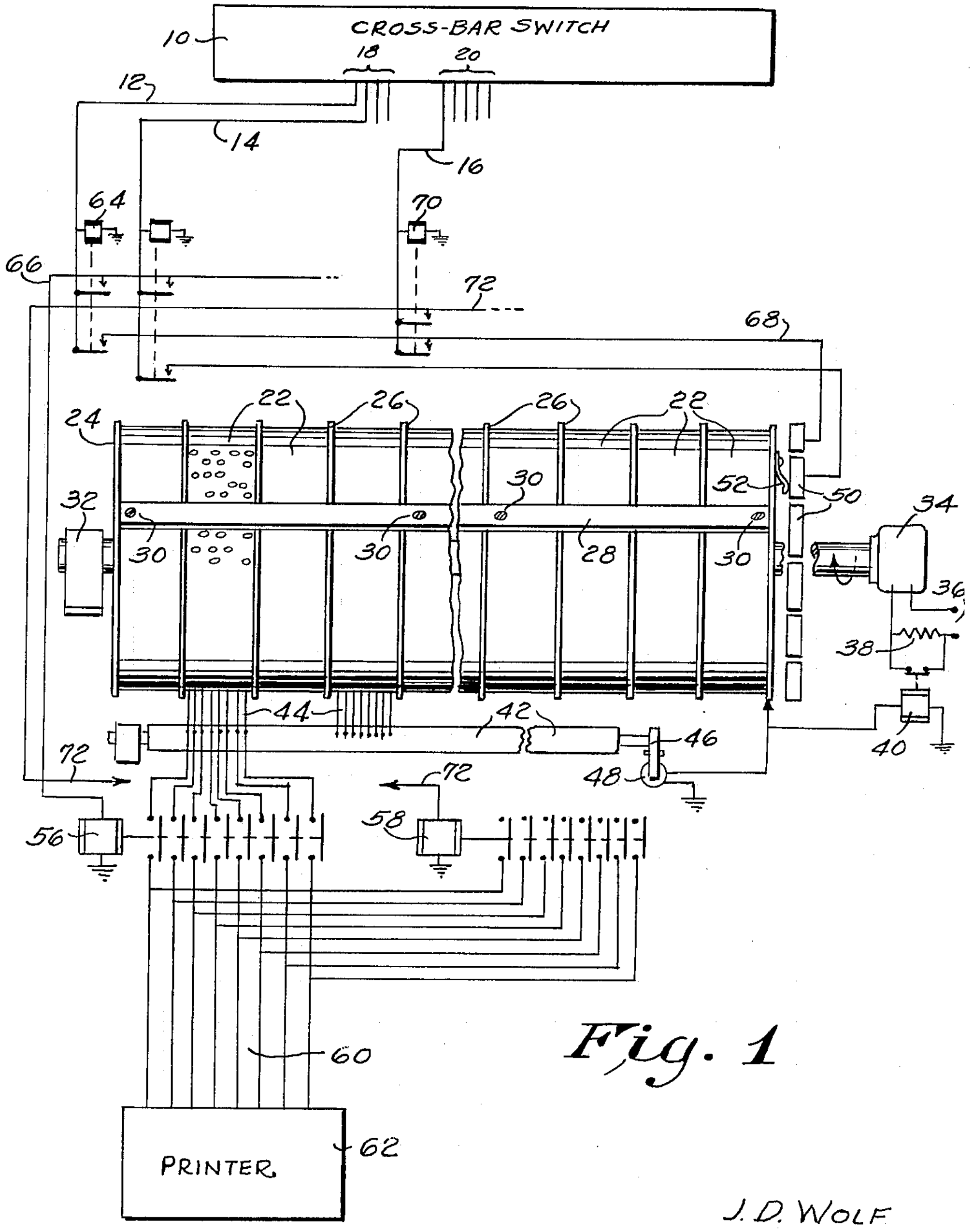
FIGURE 1 is view of a typical form of information drum according to my invention, shown in side elevation, together with its controls and a schematic representation of the operating circuits.

Accordingly, there is illustrated in FIGURE 1 of the drawings a crossbar switch 10, controlled in the well-known manner of the prior art, to effect the energization of any single one of a plurality of output leads such as those indicated by numerals 12, 14 and 16. For clarity of description in connection with the operation of the device, the conductors are illustrated as arranged in groups, the lines 12 and 14 being part of a group marked 18, and line 16 being one of a group marked 20; however, this grouping is not essential to the purposes of the invenion itself. By way of example only, it may be considered that the crossbar switch 10 provides a total of 200 output conductors, to permit the selection of up to 200 code groups from the memory storage, each of the stored groups, of course, containing sufficient codes to control the printing-calculator so as to print the clear text name desired, and to print also the digits corresponding to its cost or price factor. Auxiliary function-control codes may be associated with each group of codes in the memory device, as will appear. If, as assumed above, there are 200 complete code groups in the storage device, it is convenient to arrange these so that there are ten such groups punched in each length of paper or plastic tape 22, with adequate space between the groups on the tape. Twenty such tapes will be needed for the system being described, and they are all arranged about the periphery of a drum 24, preferably having a conductive surface, with ridges 26 to define the proper positions of the tapes. The two ends of each tape 22 are brought under a clamp bar 28 which spans the entire drum and is held in place as by screws 30.

Drum 24 is carried by a shaft received in one end by a bearing 32 and driven at its opposite end as by a two-speed motor 34, which may be a gear-reduction or other relatively slow speed motor. As shown, the motor is continuously energized from a source as at 36, through a resistor 38 arranged to be normally short-circuited by the contacts of a relay 40, so that the motor runs at its normal ("search") speed except when the relay 40 is energized, whereupon the insertion of resistor 38 in the line circuit causes the motor to slow down to a speed appropriate to the readout function. The control of this relay will be described below.

In order to provide an electrical readout from the tape codes, a bar 42 of insulating material carries a multiplicity of springy wire brushes 44; in the example shown, wherein there are eight rows of code-hole positions on each tape 22, there will be eight such brushes for each tape, and of course a total of 20 groups of these brushes, all carried by bar 42. The bar is mounted for slight pivotal motion about its long axis, under control of a crank arm 46 and a solenoid magnet 48. A spring maintains the bar in such a position that all of the brushes 44 are out of contact with the tape surfaces, except when the solenoid is energized, which rocks the bar and brings all of the brushes into reading position, wherein they may contact the drum surface wherever a punched hole in a tape exists. Thus, each group of eight brushes 44 constitutes a read head for one of the drum-mounted tapes 22. The drum rotates continuously, and the provision for lifting the brushes obviates unnecessary wear between the brushes and the tapes, but this feature, while desirable, is not essential to the operation. Obviously, also, each group of eight brushes could be mounted on its independent rocking bar, so that during readout, only one set of brushes will be riding on the selected tape, or a selected section thereof.

A fixed commutator, having in this instance ten conductive segments 50, is mounted adjacent one end of drum 24, so that each segment in turn will be engaged by a brush 52 carried by the drum and connected electrically to the conductive body (or layer) through which the code tapes are read. The tapes are so prepared that each complete group of code holes corresponds to one of the segments 50, thereby completing a circuit from the reading brushes 44 to the drum, and thence to a segment 50, only during the time that the drum rotation brings those code groups into reading position opposite the brushes. While other arrangements are possible, the one described greatly simplifies the operation of automatically "looking up" an address amongst the coded groups; output pulses can only be obtained while the selected group is actually passing under each read head.

It will be noted that a fixed contact brush 54 continuously engages the rim of drum 24, and is connected to one side of relay 40, so that the latter will be energized during the passage of any selected code group under the reading brushes 44; accordingly, the motor 34 will slow down during the readout, and the pulses will be emitted to the output channel at a speed appropriate to their function, while the searching for the proper code group can be carried out at a much higher speed. If desired, a brake or clutch arrangement can be provided to produce the slow-down, but the system described has been found to operate satisfactorily, particularly if the initial code positions of each group are left blank to allow the drum speed to settle down before actual reading is commenced. It is pointed out that no critical reading speed has to be maintained, because ordinary code-controlled printers will operate satisfactorily so long as the codes do not arrive at a speed in excess of that for which they are designed.

Associated with each group of eight brushes 44 is a transfer relay such as those designated 56 and 58. When operated, a relay 56 connects the brushes 44 of one group only to the output channel here shown as a group of eight conductors 60, leading to a printer or typewriter 62, which of course may be a calculator-printer as described in the prior copending application mentioned above. In the embodiment shown, there will be twenty of these transfer relays, with the eight contacts of each connected to the brushes of a different group, and with the output contacts all multiplied, as indicated. The desired tape to be read is hence selected merely by energizing a selected one of the relays 56, 58 and so on.

The way in which a single unique group of codes is selected for the readout can now be described. Associated with each of the output leads or conductors of the crossbar switch 10 is a relay such as at 64, having two normally-open contacts. When any of these conductors is energized, the corresponding relay will close its two contact sets. Thus, energization of the conductor 12 will operate relay 64, and the potential on the lead 12 will be extended, over the first relay contact, to relay 56, via conductor 66. Relay 56 will operate, and connect the eight brushes 44 of one group (herein shown as reading the tape second from left) to the output conductors 60. However, the brushes will not contact the tapes, because solenoid 48 is not now energized. Relay 64, when operated, also applies the potential from lead 12 over its second contact and lead 68, to one of the segments 50 of the commutator. Thereafter, when the rotating drum 24 brings the selected code group into reading position, drum brush 52 will engage that particular commutator segment, relay 40 will operate to slow down the motor, and solenoid 48 will be energized to rock bar 42 and place all of the brushes in reading position, riding upon all of the tapes 22. However, only the brushes controlled by relay 56 will deliver pulses to the printer 62. As soon as brush 52 slides off of the energized segment 50, the output circuit is automatically deenergized, and of course the lead 12 from the crossbar switch will be deenergized by reason of completion of the desired readout, under control of equipment forming no part of the present invention.

It will be seen from the above that if the crossbar switch selects amongst 200 lines in all, there will be 200 relays such as 64. The upper contacts of each relay in the group including relay 64 will be multiplied to operate the transfer relay 56, and the upper contacts of each relay (such as 70) in the next group will operate a different transfer relay, such as 58, over a separate conductor 72. In this way, the appropriate tape 22 is selected. Moreover, the second contact of relay 64 is multiplied to the second contact of relay 70 and to lead 68, and so on throughout all the relays, to effect, for each relay such as 64 and 70, the selection of a particular segment 50. In this way, a single code group on any tape can be brought into reading position very rapidly and exactly, and thereupon read out to the printer 62. The two hundred selection points are, in effect, arranged as a $20 \times 10$ matrix, one coordinate being established by the operation of the first contact of relays 64, 70 and so on, and the other coordinate being established by the operation of the second contact of the selected relay. Obviously, any equivalent matrixing scheme can be employed without departing from the system as disclosed. The illustration of a separate relay 64, 70 for each crossbar conductor is given for purposes of illustration and understanding, and not by way of essential limitation.

Figure 2:
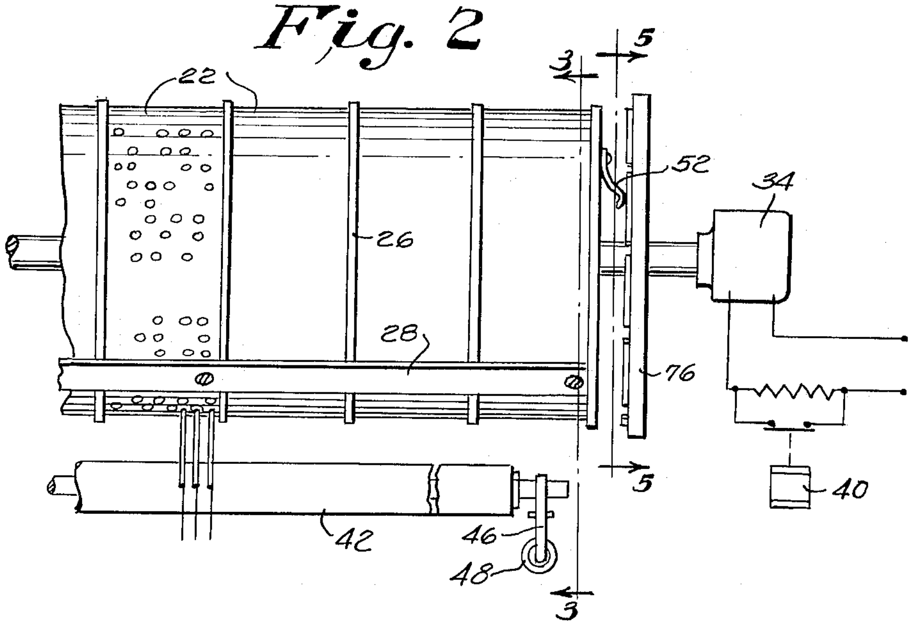
FIGURE 2 is a fragmentary view, to a somewhat larger scale, of the details of the drum itself, and of the readout brush arrangement.
Figures 3, 4, 5:
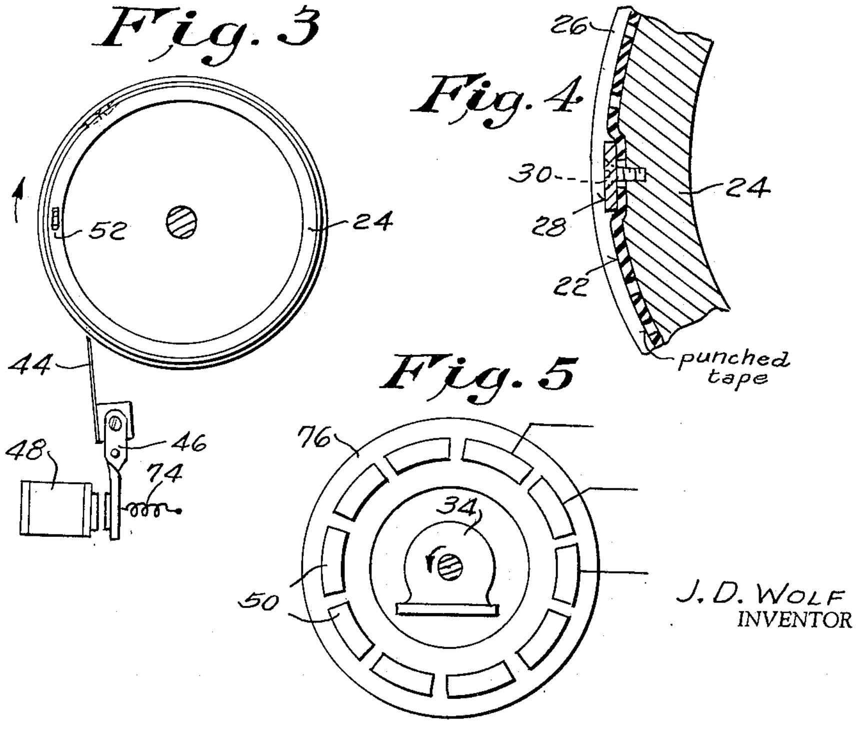
FIGURE 3 is a sectional view taken along line 3—3 of FIGURE 2.
FIGURE 4 is an enlarged sectional view of a portion of FIGURE 2, looking in the same direction as FIGURE 3, but detailing the tape clamp arrangement of the invention.
FIGURE 5 is a sectional view taken on line 5—5 of FIGURE 2, and showing the address-controlling commutator of the system.

FIGURE 2 of the drawings shows certain of the drum parts to an enlarged scale, but the same reference numerals are employed as already described. FIGURE 3 is in effect a right-hand end view of the drum, showing how brushes 44 are mounted on the rock shaft 42, controlled by the solenoid 48, and with spring 74 normally urging the brushes out of contact with the tapes.

FIGURE 4 is a further enlargement of a part of FIGURE 3, illustrating how the tapes 22 have their ends tucked under clamp bar 28, so that by loosening one or more of the clamp screws 30, a single tape can be replaced with a corrected or up-to-date version. Preferably, the tapes are of a type readily prepared on a printer such as 62, but they may be made at a central location, and distributed to the user from time to time, as prices or item information may change. It is unnecessary to disturb any tapes not involved in the changes, and of course the operations required are very simple and obvious, even to relatively unskilled employees and users. The clamp bar 28, as shown in FIGURE 4, is preferably mounted in a lengthwise groove or depression in the drum surface, so as not to disturb the reading brushes when they must pass over this portion of the drum. The bar 28 may be insulated from the metal parts of the drum, or it may be made of insulating material, but obviously it may be of metal if a suitable gap is provided between two of the segments of the commutator. Normally, energization of all of the eight brushes of any set would not, in the nature of tape-controlled devices, produce any defect in the operation thereof, for reasons obvious to those skilled in the art.

FIGURE 5 illustrates the face appearance of one form of the commutator, the segments 50 being mounted as upon an insulating panel or board 76.

The codes contained in each of the groups appearing in tapes 22 may include, in addition to letter and number codes for controlling the printer, one or more function codes such as carriage tabulation, carriage return and like codes, as familiar to those using such printers. Specifically, it will ordinarily be desired to tabulate the printer carriage to a new column before the item price is read out of the tape 22. If such a printer operation requires more time than the standard interval for a letter key operation, the presently disclosed asynchronous system (in which the drum 24 rotates continuously without ever stopping) can be made quite satisfactory merely by providing a short section of tape which is devoid of codes, following each such functional control code. One or more carriage return codes may precede or follow the complete set of codes in each group, and where necessary these also can be separated from adjacent letter or numeral codes to provide adequate time for the carriage return functions.

As described herein, the code-controlled contacts are of the simple "make" type; that is, potential is applied to certain leads 60 corresponding to the existence of a punched hole in the tape at a particular position. In some systems, control of a printer is facilitated by providing a reader which can actually open a circuit, as well as close a circuit, in response to the existence of a code punch perforation. The present invention can readily be adapted to such operation, merely by using the control output leads 60 to energize relays whose contact combinations can provide any desired form of output, either the closing, or opening, of any selected output channel circuit, when a perforation is sensed. Only a single set of such relays (herein, eight in number for use with eight-channel tape) is required, these being controlled by the leads 60 at a point below the multiplying of the contact leads from transfer relays 56, 58 and so on.

Figure 6:
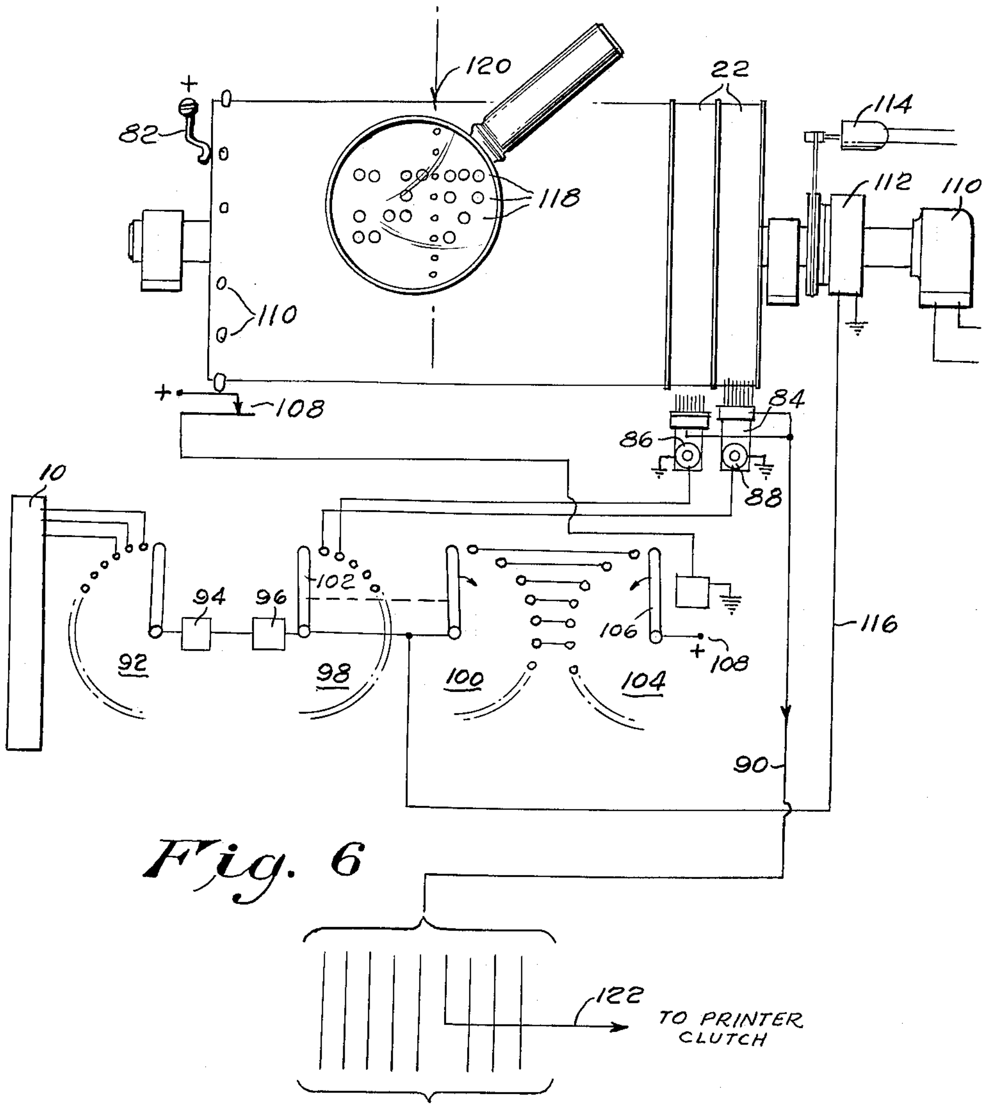
FIGURE 6 is a schematic view of a form of the invention incorporating several modifications of the drum drive and control system.

FIGURE 6 of the drawings illustrates an arrangement according to the principles of the invention, but modified in several respects, some of which have been described above. The drum 80 is again metal or metal clad, and is constantly connected to a source of potential as by a brush 82. However, in this case, the sets of pickoff brushes pertinent to each of the tapes are mounted upon rocker armatures such as 84, normally spring-urged so that the brushes are out of contact with the tapes. Each armature, which may be identical with the armature of an ordinary relay, has a solenoid magnet such as indicated at 86, 88, and when the solenoid is energized, a particular set of brushes is urged against the corresponding tape 22. The magnet 88 is shown in its energized condition, so that the right-hand set of brushes will contact its tape. The plural conductors connected to the brushes of that set are indicated at 90 as a single line, to simplify the drawing. Since only one set of brushes will be in contact with a tape at a time, all of the sets can be connected in multiple, as indicated.

The crossbar switch or other line-selecting mechanism is again indicated by numeral 10, but in this case a step-by-step selection system is shown as controlled by the switch 10. Thus, in a manner well known to those familiar with automatic telephone switching of the step-by-step type, a finder switch such as a 200 point rotary switch 92 has its bank contacts connected to the crossbar output terminals, and is arranged to home automatically to the single marked terminal. In so doing, its control apparatus 94 operates the controls 96 of a slave switch having, for example, a 20's selector stage 98 and a 10's selector stage 100. Each terminal of stage 98 prepares a circuit to a particular one of the solenoids 86, 88 and so on, from the contact wiper 102 of that stage, which wiper is connected to the contact wiper of the 10's selector stage 100. The bank terminals of stage 100 are connected to the bank contacts of a counter switch 104 whose wiper contact 106 is driven step-by-step by the usual magnet, energized periodically by a contact set 108 operated each tenth of a drum revolution as by spaced studs or buttons 110 on the drum periphery.

When the wipers of stages 98 and 100 have been positioned in response to a selection by the crossbar switch 10, a certain magnet 88 will be connected to the wiper 102, and thence through the wiper of stage 100 to one of its bank terminals corresponding to the ten's selection. The wiper 106 will be advanced one step for each tenth of a drum revolution, so that at one position of the drum, potential will be applied from source terminal 108 to wiper 106, stage 100, and wiper 102, and thence to the selected solenoid magnet 88. The appropriate brushes of that reader contact set will then be energized from the drum via brush 82, in accordance with the codes punched in the selected portion of the selected tape.

The drive for the drum in this case is also modified. A high-speed search drive is indicated by motor 110, coupled to the shaft of the drum as through a magnetic clutch 112. The drum shaft is also connected, as through a belt or other slip drive, to a slow speed or readout drive motor 114. When a final code group selection has been made, the potential from source 108 is applied to clutch 112 over lead 116, disconnecting the high speed drive motor 110 so that the drum is turned at a suitable readout speed by motor 114. As before, a suitable short interval may be allowed for the drum speed to drop sufficiently, before readable code punches in the tapes 22 arrive at the read contacts.

In certain types of code-controlled printers, especially of the start-stop variety akin to teletypewriter printers, operation of a clutch magnet in the printer is required for each code-reading operation. If desired, the clutch-control potential so required can readily be obtained, in perfect synchronism with the arrival of each row of punched holes at the read-out contact brushes, by using the feed hole normally present in code tapes of this type. As shown in the enlarged portion of FIGURE 6, successive rows of eight code-punch positions are indicated at 118, and within each row there is a feed hole indicated by the vertical row 120. In normal eight-channel tape, there will be eight code hole positions in each horizontal row 118. These are read by the eight-channel readout brushes as already described, and a ninth brush can easily be positioned to read the occurrence of the corresponding feed hole, which will be present in each code row 118 regardless of the code punched in that row.

Thus, as shown at the bottom of FIGURE 6, the channel 90 may in this embodiment have 9 conductors, of which eight control the code magnets of the printer, while the other conductor 122 controls the printer clutch magnet. With this arrangement, perfection of printer control is readily achieved without regard to the accuracy of placement of the tapes 22 on the drum, so far as peripheral position is concerned.

What is claimed is:

1. A coded information storage device comprising a rotatable drum, means for continuously rotating said drum about its central axis, at least the surface of said drum being formed of electrically conductive material, and a plurality of coded tapes, each formed of insulating material punched to define the desired codes, wrapped completely about the periphery of said drum in side by side relationship; a plurality of reading heads including tape-sensing contact fingers mounted for individual movement of said heads into and out of reading engagement with the tapes and the exposed drum surface lying beneath each code perforation, said reading heads being out of contact with said tapes in the nonreading state of the device, and electrically operated means for bringing said heads into reading engagement with said tapes at the initiation of and during readout of said tapes.

2. A coded information storage and retrieval system comprising a drum and means for rotating the drum constantly about its axis, a plurality of coded information tapes individually wrapped tightly about the entire periphery of said drum in side-by-side relationship, code reading means disposed adjacent each of said tapes but out of code-reading position, switch means for selectively connecting any one of said code reading means to a common output circuit, a plurality of selecting circuits, and means responsive to the energization of any selected one of said selecting circuits for operating said switch means during a fractional part of a revolution of said drum, and for simultaneously moving at least the selectively connected one of said code reading means into code-reading position relative to the adjacent one of said tapes.

3. A coded information storage and retrieval system comprising a drum and means for rotating the drum constantly about its axis, a plurality of coded information tapes individually secured upon the periphery of said drum in side-by-side relationship, code reading means disposed adjacent each of said tapes, switch means for selectively connecting any one of said code reading means to a common output circuit, a plurality of selecting circuits, and means responsive to the energization of any selected one of said selecting circuits for operating said switch means during a predetermined fractional part of a revolution of said drum.

4. A coded information storage and retrieval system comprising a drum and means for rotating the drum constantly about its axis, a plurality of coded information tapes individually secured about the periphery of said drum in side-by-side relationship, code reading means disposed adjacent each of said tapes but out of code-reading position, switch means for selectively connecting any one of said code reading means to a common output circuit, a plurality of selecting circuits, and means responsive to the energization of any selected one of said selecting circuits for operating said switch means during a predetermined fractional part of a revolution of said drum, and for simultaneously moving only the selectively connected one of said code reading means into code-reading position relative to the adjacent one of said tapes.

5. A coded information storage and retrieval system, comprising a drum, means for constantly rotating said drum about its axis, at least the surface of said drum being formed of electrically conductive material, a plurality of coded tapes formed of insulating material perforated to define desired codes and wrapped completely around the drum in side by side relationship, code reading means including a plurality of reading heads having tape-sensing contact fingers mounted for individual movement of said heads into and out of reading engagement with the tapes and the exposed drum surface lying beneath each code perforation, said reading heads being out of reading engagement when said system is in a nonreading state, and electrically operated means for automatically moving said heads into reading engagement with said tapes when the system is actuated to the readout state.

6. The system as set forth in claim 5, in which means are provided to rotate said drum at different speeds during the time said heads are in, and are out of, reading engagement with said tapes.

7. The system as set forth in claim 5, further characterized by switch means for selectively connecting any one of said code reading means to a common output circuit, a plurality of selecting circuits, and means responsive to the energization of any selected one of said selecting circuits for operating said switch means for simultaneously moving a selectively connected one of said code reading means into code reading position relative to the adjacent one of said tapes.

References Cited by the Examiner

UNITED STATES PATENTS

| | | | |
|---|---|---|---|
| 897,765 | 9/1908 | Morin | 340—174.1 |
| 2,269,293 | 1/1942 | Stuart et al. | 164—115 |
| 2,362,827 | 11/1944 | Joachim | 340—163 |
| 2,477,741 | 8/1949 | Haberman | 200—46 |
| 2,481,398 | 9/1949 | Danisch | 179—100.2 |
| 2,587,532 | 2/1952 | Schmidt | 340—174.1 |
| 2,604,262 | 7/1952 | Phelps et al. | 235—159 |
| 2,617,704 | 11/1952 | Mallina | 235—61 |
| 2,645,969 | 7/1953 | Daniel | 340—174.1 |
| 2,652,196 | 9/1953 | Sterling | 340—174 |
| 2,656,109 | 10/1953 | Lindars | 200—46 |
| 2,712,640 | 7/1955 | Mork et al. | 340—174 |
| 2,730,694 | 1/1956 | Williamson | 340—174.1 |
| 2,737,342 | 3/1956 | Nelson | 340—174.1 |
| 2,938,195 | 5/1960 | Begun | 340—174.1 |

OTHER REFERENCES

"Design of Switching Circuits," by Keister et al., Van Nostrand Co., pages 330–332, 1951.

IRVING L. SRAGOW, *Primary Examiner.*

STEPHEN W. CAPELLI, *Examiner.*